(No Model.)
C. H. KNAPP.
MACHINE FOR PREPARING THE SOIL FOR CROPS.
No. 275,773. Patented Apr. 10, 1883.
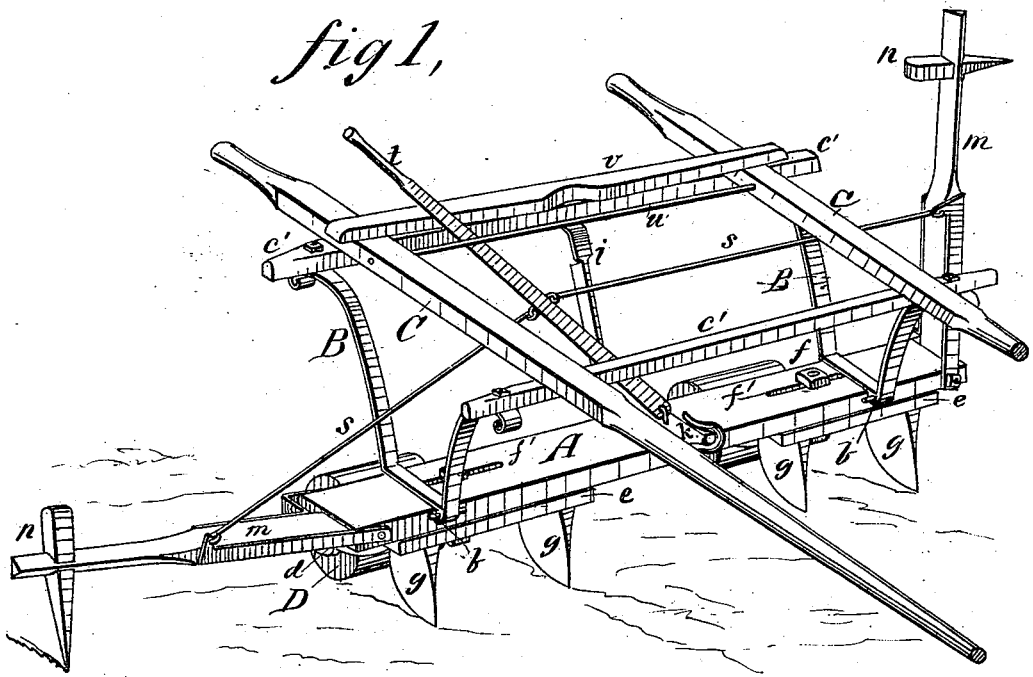
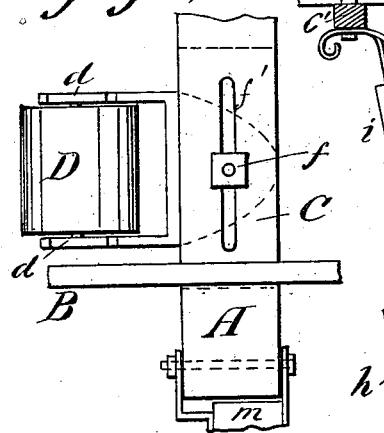
WITNESSES:
Chas. T. Howell,
C. Sedgwick
INVENTOR:
C. H. Knapp
BY Munn & Co.
ATTORNEYS.

UNITED STATES PATENT OFFICE.

CHARLES H. KNAPP, OF MANSFIELD, PENNSYLVANIA, ASSIGNOR TO HIMSELF AND RANSOM FERDINAND WILSON, OF SAME PLACE.

MACHINE FOR PREPARING THE SOIL FOR CROPS.

SPECIFICATION forming part of Letters Patent No. 275,773, dated April 10, 1883.

Application filed October 11, 1882. (No model.)

*To all whom it may concern:*

Be it known that I, CHARLES H. KNAPP, of Mansfield, in the county of Tioga and State of Pennsylvania, have invented a new and Improved Machine for Preparing the Soil for Crops, of which the following is a full, clear, and exact description.

My improved machine is intended to form raised ridges for receiving tobacco or other plants, and it is constructed to raise and roll two ridges at once. I also combine with it a gage or marker, and construct the machine so that the rows or ridges can be made of any required depth and at any suitable distance apart, as herein described and claimed.

Reference is to be had to the accompanying drawings, forming a part of this specification, in which similar letters of reference indicate corresponding parts in all the figures.

Figure 1 is a front perspective view of my improved machine. Fig. 2 is a transverse section, showing the adjustment for regulating the depth of the ridge. Figs. 3 and 4 are detail views, showing the attachment of the rollers to the main frame.

The frame of the machine consists of a cross-bar, A, upon which are two brackets, B B, on which the thill-bars $c'$ $c'$ are attached. The two shafts C are connected upon the thill-bars $c'$, and the connection of the brackets B to the main bar A is made by hinged joints at $b$ on the forward edge of the bar, which allows the shafts to be raised and lowered. These hinged joints may be of any suitable character.

D D are the rollers, sustained in brackets $d$, which are connected upon movable slide-blocks $e$, attached at the ends of the main cross-bar A. The blocks $e$ are attached by bolts $f$, adjustable in slots $f'$ in the cross-bar A, so that the distance of the two rollers from each other can be readily adjusted. The slide-blocks $e$ also carry knives or scrapers $g$, two of which are placed in connection with each roller. The brackets $d$ are provided with two or more apertures, as shown at $h$, to receive the axles of the rollers, and these apertures being placed at different heights, the rollers can be raised and lowered by changing their axles from one set of holes to the other. This is for the purpose of regulating the depth of the ridges.

The shafts C extend to the rear, for use as handles in manipulating the machine.

To the rear thill-bar, $c'$, is attached an arm, $i$, which extends downward and through a slot in a plate, $k$, attached on bar A, and the arm has notches for engaging plate $k$, in order to hold the shafts in position either raised or lowered. This arrangement regulates the depth to which the scrapers $g$ act, and also allows the whole weight of the machine to be thrown upon the rollers when the handles are raised, so as to facilitate turning and allow the machine to be moved upon roads.

To each end of the cross-bar A an arm, $m$, is jointed, and at the outer ends of these arms are attached markers $n$, for the purpose of gaging or marking a row at either side of the machine, as may be required, at the same time that two rows or ridges are being raised and rolled.

At the center of bar A is hung a hand-lever, $t$, and rods $s$ $s$ connect this lever with arms $m$, for simultaneous movement of both arms when lever $t$ is moved. The arrangement is such that the two arms stand up from the ground at an angle of about forty-five degrees when the lever is in the middle position, and either one is brought down to the horizontal position for marking the ground when the lever is moved to either side. The lever $t$ engages a notched cross-bar, $v$, in its middle position, and is pressed thereto by a spring-rod, $u$.

In the operation of the machine it is to be drawn forward by horse-power, and the two knives $g$ at each side serve to raise a ridge, the top of which is rolled and leveled by the rollers D immediately following. The rollers D, after being adjusted, will always maintain the same position with reference to the knives, and will therefore roll the top of the ridge uniformly, the depth being regulated, as above described, by the adjustment of the handles.

This machine may also be used for raising the soil around tobacco, corn, and other plants.

Having thus fully described my invention, I claim as new and desire to secure by Letters Patent—

1. The combination of the ridging knives or scrapers $g$, brackets $d$, having adjusting-holes $h$, and the adjustable rollers D, substantially as described, and for the purpose of simultaneously raising and rolling the ridge, as set forth.

2. The combination, with the main frame A, of the adjustable blocks $e$, carrying the rollers D and knives $g$, substantially as shown and described.

3. The combination of the thills or shafts C with the hinged brackets B and main cross-bar A, substantially as shown and described.

4. The combination of the shaft C, extended to the rear to form handles, the brackets B, and the main cross-bar A, substantially as shown and described.

5. The combination of the thills C, rear thill-bar, $c'$, hinged brackets B, main cross-bar A, slotted plate $k$, secured thereto, and notched arm $i$, substantially as described.

6. The combination, with the cross-bar A, having marker-arms $m$, hinged to its opposite ends, hinged brackets B, thills C, and thill-bars $c'$, of the lever $t$, pivoted to the cross-bar A, cross-bar $v$, notched in its middle, rods $s\ s$, and spring-rod $u$, substantially as described.

C. H. KNAPP.

Witnesses:
HENRY ALLEN,
M. L. CLARK.